United States Patent [19]

Schreuder

[11] Patent Number: 4,577,150
[45] Date of Patent: Mar. 18, 1986

[54] PHASE MEASURING METHOD AND APPARATUS

[75] Inventor: Jan Schreuder, Cape Town, South Africa

[73] Assignee: Plessey South Africa Limited, Cape Town, South Africa

[21] Appl. No.: 498,467

[22] Filed: May 26, 1983

[30] Foreign Application Priority Data

Jun. 9, 1982 [ZA] South Africa ............. 82/4058

[51] Int. Cl.⁴ ..................................... G01R 25/00
[52] U.S. Cl. ......................... 324/83 R; 343/12 R; 328/133
[58] Field of Search ............... 324/83 R, 83 A, 83 D, 324/83 FE, 83 Q, 83 FM, 86, 207; 33/125 R; 73/490; 455/67; 343/394, 395, 396, 397, 12 R; 179/17 R; 328/133, 134, 143, 155

[56] References Cited

U.S. PATENT DOCUMENTS

| 2,241,139 | 5/1952 | Wadley | 343/12 |
| 2,709,253 | 5/1955 | Haywood | 343/12 R |
| 3,200,399 | 8/1955 | Schneider | 343/12 |
| 3,213,449 | 10/1965 | Kobayashi | 343/12 R |
| 3,315,257 | 4/1967 | Sauberlich | 343/12 |
| 3,641,447 | 2/1972 | Gaines | 329/126 |
| 3,725,920 | 4/1973 | Kupfer | 343/6.5 R |
| 3,769,585 | 10/1973 | Fremouw | 343/386 |
| 3,980,948 | 9/1976 | Olive | 324/83 D |
| 4,229,102 | 10/1980 | Wiklund | 356/5 |

FOREIGN PATENT DOCUMENTS 1165771 10/1969 United Kingdom .
2011750 7/1979 United Kingdom .

Primary Examiner—Michael J. Tokar
Attorney, Agent, or Firm—Ladas & Parry

[57] ABSTRACT

A continuous wave electromagnetic distance measuring system comprises a master station 12.3 and a remote station 12.4. A pattern signal having an accurately known pattern frequency is propagated electromagnetically from the master station to the remote station and an auxiliary pattern signal is propogated electromagnetically from the remote station to the master station. Mixing of the pattern and auxiliary pattern signals produces a first comparison signal at the master station and a second comparison signal at the remote station, the comparison signals each having a frequency which is equal to the frequency difference between the pattern and auxiliary pattern signals. The first comparison signal is phase compared with a first reference signal to provide first phase data, and the second comparison signal is phase compared with a second reference signal to provide second phase data. The second phase data is relayed in coded form to the master station. First and second phase data resulting from a plurality of pattern-/auxiliary pattern signal combinations is processed at the master station to obtain an accurate indication of the distance between the stations. The pattern signal and the first reference signal are each derived from a first clock signal. Similarly, the auxiliary pattern signal and the second reference signal are each derived from a second clock signal. By selection of suitably stable reference oscillators for producing the clock signals, errors introduced through phase slip between the clock signals can be reduced to negligible proportions. There is disclosed a method of compensating precisely for any such errors by computing and then applying a correction factor. There is also disclosed a method of straddle measuring in which any such errors automatically fall away.

10 Claims, 2 Drawing Figures

PHASE MEASURING METHOD AND APPARATUS

FIELD OF THE INVENTION

This invention relates to a phase measuring method and apparatus. Although the invention finds particular application in continuous wave electromagnetic distance measuring systems, in which a series of phase measurements are obtained as part of the distance measuring process, the invention is not limited to application in such distance measuring systems.

BACKGROUND OF THE INVENTION

The invention more particularly relates to a method of obtaining a primary measurement of the differences in the phase relationship between a pair of comparison signals at predetermined different times, the two comparison signals existing simultaneously and having the same comparison frequency, a first of the comparison signals being produced at a first station and a second of the comparison signals being produced at a second station spaced from the first station.

In one particular continuous wave electromagnetic distance measuring system in which such a phase measuring method is employed, and which is described in more detail hereinafter with reference to FIG. 1, the comparison signals of each pair of comparison signals are produced by causing a pattern signal to be propagated electromagnetically from a master station to a remote station, causing an auxiliary pattern signal to be propagated electromagnetically from the remote station to the master station, mixing the pattern signal with the auxiliary pattern signal at the master station to produce the first comparison signal, and mixing the pattern signal with the auxiliary pattern signal at the remote station to produce the second comparison signal, the comparison frequency of the two comparison signals being equal to the difference in frequency between the pattern and auxiliary pattern signals. The second comparison signal is then relayed to the master station by modulating it on a sub-carrier signal and modulating the modulated sub-carrier signal on a carrier which is used to propagate the auxiliary pattern signal to the master station. At the master station the relayed second comparison signal is detected and then phase compared with the first comparison signal. Such a system is also described in, for example, U.S. Pat. No. 2,907,999 to Wadley.

Relaying of the second comparison signal to the master station in the above manner gives rise to certain difficulties.

First, as a result of the transmission and reception of the pattern and auxiliary pattern signals, each of the comparison signals is degraded by noise. In being relayed to the master station, the second comparison signal is degraded even further by noise. This further signal to noise degradation detrimentally effects the accuracy of the phase measurements.

Second, a certain amount of cross coupling occurs between the two comparison frequency modulations in being amplified and detected through a common channel at the master station. This is usually referred to as contamination and can lead to rather unpredictable phase errors.

Third, relaying of the second comparison signal to the master station by modulation of the carrier which is used to propagate the auxiliary pattern signal to the master station reduces the transmission power available for propagating the auxiliary pattern signal. This again increases the noise content of the signals.

Other methods of relaying the phase information of the second comparison signal to the master station have been used in an attempt to alleviate one or other of the above difficulties. For example, there has been proposed a system in which the second comparison signal is frequency divided by a factor of two before being relayed to the master station, and at the master station the frequency of the signal is again, after detection, multiplied by two. This reduces contamination, but at the cost of also reducing the transmitted phase information by a factor of two and correspondingly increasing the noise content.

It is an object of the present invention to provide a novel and inventive system for dealing with contamination and signal to noise deterioration, which system at the same time leads to an elegant and economic simplification of existing continuous wave electromagnetic distance measuring systems.

SUMMARY OF THE INVENTION

According to the invention there is provided a method of obtaining a primary measurement of the difference in the phase relationship between a pair of comparison signals at predetermined different times, the two comparison signals existing simultaneously and having the same comparison frequency, a first of the comparison signals being produced at a first station and a second of the comparison signals being produced at a second station spaced from the first station, which method comprises:

generating at the first station a first frequency-stable reference signal having a first reference frequency suitably close to the comparison frequency;

generating at the second station a second frequency-stable reference signal having a second reference frequency suitably close to the comparison frequency;

measuring at the first station the phase relationship between the first comparison signal and the first reference signal at each of said predetermined times to provide a first secondary measurement;

measuring at the second station the phase relationship between the second comparison signal and the second reference signal at each of said predetermined times to provide a second secondary measurement; and bringing together and suitably processing the first and second secondary measurements to extract therefrom said primary measurement.

The phase relationship between the first comparison signal and the first reference signal at each of said predetermined times is measured as an average over several cycles of the first comparison signal; and the phase relationship between the second comparison signal and the second reference signal at each of said predetermined times is measured as an average over several cycles of the second comparison signal.

The first and second comparison signals may be produced by:

causing a pattern signal having an accurately known pattern frequency to be propagated electromagnetically from the first station to the second station;

causing an auxiliary pattern signal to be propagated electromagnetically from the second station to the first station;

mixing the pattern signal with the auxiliary pattern signal at the first station to produce said first comparison signal; and mixing the pattern signal with the auxiliary pattern signal at the second station to produce said second comparison signal, the comparison frequency being equal to the frequency difference between the pattern frequency and the auxiliary pattern frequency.

Each of said pattern signals may be derived from a first clock signal, each corresponding auxiliary pattern frequency derived from a second clock signal, the first reference signal derived from the first clock signal, and the second reference signal derived from the second clock signal.

A said measuring step at each respective station is carried out at each of times t1, t2, and tx respectively;
- the measuring steps at times t1 and tx are each carried out on a respective comparison signal produced by pattern signals of the same pattern frequency and auxiliary pattern signals of the same auxiliary pattern frequency; and
- said processing includes, by means of suitably programmed data processor;
- computing a correction factor k in accordance with the following quotation;

$$k = \frac{a1 - b1 - ax + bx}{tx - t1}$$

where a1 abd b1 are the first and second secondary measurements respectively provided by the measuring steps at time t1; and ax and bx are the first and second secondarys measurements respectively provided by the measuring steps at time tx; and computing said primary measurement in accordance with the following equation:

$$a = a1 - b1 - a2 + b2 \; (t2 - t1)$$

where $\alpha$ is the primary measurement; and
a2 and b2 are the first and second secondary measurements respectively provided by the measuring steps at time t2.

Alternatively, a said measuring step may be carried out at each of times t1, t2, and t3 respectively;
- the measuring steps are carried out at equally spaced time intervals so that $t1 - t2 = t2 - t3$;
- the measuring steps at times t1 and t3 respectively are carried out on respective comparison signals produced by pattern signals of the same pattern frequency and auxiliary pattern signals of the same auxiliary pattern frequency; and
- said processing includes computing said primary measurement in accordance with the following equation:

$$a = \frac{a1 - b1 + a3 - b3 - a2 + b2}{2}$$

whereas $\alpha$ is the primary measurement;
- a1 and b1 are the first and second secondary measurements respectively provided by the measuring steps at time t1;
- a2 and b2 are the first and second secondary measurements respectively provided by the measuring steps at time t2; and
- a3 and b3 are the first and second secondary measurements respectively provided by the measuring steps at time t3.

The invention extends to a method of continuous wave electomagnetic distance measurement in which each of a plurality of primary measurements are obtained in accordance with the method defined above, the distance between the first and second stations being derived from the primary measurements.

The invention further extends to apparatus adapted to operate in accordance with the method defined above.

BRIEF DESCRIPTION OF THE INVENTION

The invention will now be described in more detail, by way of example, with reference to the accompanying drawings.

In the drawings:

FIG. 1 is a block diagram of a typical continuous wave electromagnetic distance measuring system in accordance with the prior art; and FIG. 2 is a block diagram of a continuous wave electromagnetic distance measuring system in accordance with the invention.

DETAILED DESCRIPTION OF THE DRAWINGS

Referring first to FIG. 1, reference numeral 10 generally indicates a continuous wave electromagnetic distance measuring system comprising a master station 12.1 and a remote station 12.2. The stations 12.1, 12.2 are spaced apart and the system is able to measure the distance D between them to a high degree of accuracy. Measurements take place at the master station 12.1, the remote station 12.2 functioning in a supportive role. However, the master and remote stations have the same circuit sections (indicated by the individual blocks in the drawing) and are provided with suitable switching means so that the master station can be switched to operate as a remote station, and the remote station to operate as a master station. In the description that follows, and in the drawing, the same reference numerals are used to designate the same circuit sections, except that the reference numerals for the master station 12.1 include the suffix '0.1' and those for the remote station 12.2 the suffix '0.2'. The interconnections between the various circuit sections are indicated in the drawing by arrowed lines.

The master station 12.1 comprises the following circuit sections, namely: a microwave generator 14.1, a circulator 16. 1, a transmit/receive antenna 18.1, a microwave mixer 20.1, an IF amplifier 22.1, a carrier modulator 24.1, a frequency synthesiser 26.1, a subcarrier generator 28.1, a subcarrier modulator 30.1, an IF demodulator 32.1, a subcarrier demodulator 34.1, a first squaring amplifier 36.1, a second squaring amplifier 38.1, a phase comparator 40.1, a microprocessor 42.1, and a reference oscillator 44.1.

The remote station 12.2 has the same circuit sections as the master station 12.1, but their interconnection is different, as indicated in the drawing.

The operation of the system 10 is as follows. Microwave energy at a carrier frequency fcM is generated by the generator 14.1 and transmitted from the antenna 18.1 to the remote station 12.2, where it is received by the antenna 18.2 and fed to the mixer 20.2. Similarly, microwave energy at a carrier frequency fcR is generated by the generator 14.2 and transmitted from the antenna 18.2 to the master station 12.1, where it is received by the antenna 18.1 and fed to the mixer 20.1. In the mixer 20.1 (master station) the received microwave energy is mixed with part of the microwave energy generated locally by the generator 14.1. In the mixer 20.2 (remote station) the received microwave energy is mixed with part of the microwave energy generated locally by the generator 14.2.

In the frequency synthesiser 26.1 a pattern signal of accurately known pattern frequency fPM is generated and this, through the modulator 24.1, is used to frequency modulate the microwave carrier generated by the generator 14.1. The pattern frequency is derived from the output of the reference oscillator 44.1. Under control of the microprocessor 42.1, pattern signals of any one of a number of different pattern frequencies fPM can be generated. Similarly, at the remote station 12.2, and under control of the microprocessor 42.2, any one of a number of different auxiliary pattern signals of accurately known auxiliary pattern frequencies fPR can be generated. The auxiliary pattern signal generated is, through the modulator 24.2, used to frequency modulate the microwave carrier generated by the generator 14.2.

Mixing in the mixer 20.1 produces intermodulation products among which there is an IF signal having a frequency fcM-fcR, amplitude modulated at a comparison frequency fB. Likewise, an IF signal having the same frequency fcM-fcR and being amplitude modulated at the same comparison frequency fB is produced by the mixer 20.2. All higher frequency intermodulation products are filtered out by the limited IF bandwidth of the IF amplifiers 22.1, 22.2.

The comparison frequency fB is equal to the frequency difference between the pattern and auxiliary pattern frequencies. The pattern and auxiliary pattern frequencies are selected so that the comparison frequency fB is substantially lower than the pattern/auxiliary pattern frequency and so that it does not change significantly for different pattern/auxiliary pattern frequency combinations. The frequency of the IF signals also does not change for different pattern/auxiliary pattern frequency combinations, as the frequency difference between the carrier frequencies fcM and fcR is kept constant.

At the master station 12.1 the comparison frequency fB is detected by the IF demodulator 32.1, and at the remote station 12.2 by the IF demodulator 32.2, thus producing two comparison signals, namely a first comparison signal at the master station and a second comparison signal at the remote station.

The first comparison signal is squared in the first squaring amplifier 36.1 to produce a first zero-crossing signal, and this is fed to the phase comparator 40.1.

The second comparison signal is relayed to the master station, and this takes place as follows: The second comparison signal is, through the subcarrier modulator 30.2, modulated on a subcarrier generated by the subcarrier generator 28.2. The modulated subcarrier in turn is used to further modulate the microwave carrier, through the carrier modulator 24.2, and is thus transmitted to the master station 12.1 as modulation of the microwave carrier. At the master station the modulated subcarrier appears as modulation of the IF signal at the output of the IF amplifier 22.1 and is detected by the IF demodulator 32.1. The detected subcarrier signal is fed to the subcarrier demodulator 34.1, where the second comparison frequency is detected, thus recovering the relayed second comparison signal. The relayed second comparison signal is squared in the second squaring amplifier 38.1 to produce a second zero-crossing signal, and this is fed to the phase comparator 40.1.

From the first and second zero-crossing signals the phase comparator 40.1 determines the phase difference between the first comparison signal and the relayed second comparison signal, to produce phase data. The phase data is fed as data input to the microprocessor 42.1.

The process described above is repeated for different pattern/auxiliary pattern frequency combinations, providing further data input to the microprocessor 42.1. From the data input provided by a full sequence of pattern/auxiliary pattern frequency combinations, the microprocessor computes the distance D in a manner which is known in the art, and this information is then available as data output from the microprocessor.

More particularly, a phase measurement $\alpha Pr$, $\alpha P1$, $\alpha P2$ etc is obtained at each of a number of pattern frequencies fPr, fP1, fP2 etc, the pattern frequencies fP1, fP2 etc being related to the reference pattern frequency fPr as follows:

$$fM1 = fPr - fP1$$

$$fM2 = fPr - fP2$$

etc where fM1, fM2 etc are a series of imaginary measuring frequencies. From the phase measurements there can then be derived a series of derived measurements $\alpha M1$, $\alpha M2$ etc, each representing the phase delay that would be undergone if a signal at the corresponding measuring frequency were to be propagated along the propagation path. The derived measurements are derived as follows:

$$\alpha M1 = \alpha Pr - \alpha P1$$

$$\alpha M2 = \alpha Pr - \alpha P2$$

etc

As is known in the art, this technique of deriving said derived measurements by subtraction has the effect of substantially eliminating any instrumental phase delays incorporated in the phase measurements.

In dynamic applications, ie where the distance to be measured changes with time, it is known to carry out straddle measurements. In this techniques a phase measurement αPr at the reference pattern frequency is obtained before and after each primary phase measurement at the other pattern frequencies. In deriving the measurements, use is then made of the average of the two phase measurements at the reference pattern frequency.

As mentioned earlier, the microprocessor 42.1 controls the frequency synthesiser 26.1 of the master station 12.1. The microprocessor 42.1 also indirectly, via the microprocessor 42.2, controls the frequency synthesiser 26.2 of the remote station. This it does by providing command signals which, through the subcarrier modulator 30.1, are modulated on a subcarrier generated by the subcarrier generator 28.1. The modulated subcarrier in turn is used to further modulate the microwave carrier, through the carrier modulator 24.1, and is transmitted to the remote station 12.2 as modulation of the microwave carrier. At the remote station, the mdoulated subcarrier appears as modulation of the IF signal at the output of the IF amplifier 22.2 and is detected by the IF demodulator 32.2. The detected subcarrier signal is fed to the subcarrier dmodulator 34.2 where the command signals are retrieved. The command signals are then fed to the microprocessor 42.2, where they are processed for use in controlling the frequency synthesiser 26.2.

The output of each reference oscillator 44.1, 44.2 can also be used as a clock input for the respective microprocessor 42.1, 42.2.

It will be noted that the squaring amplifiers 36.2 and 38.2, and the phase comparator 40.2 of the remote station 12.2 are not utilised when this station is operating in the remote mode.

Referring now to FIG. 2, reference numeral 10.1 indicates a continuous wave electromagnetic distance measuring system which is, in certain respects, similar to the system 10 of FIG. 1, but which is adapted to operate in accordance with the present invention. The system 10.1 comprises a master station 12.3 and a remote station 12.4. Where similar circuit sections as in FIG. 1 are used, they are designated by the same reference numerals as in FIG. 1, except that the suffix '0.3' is used for the master station 12.3, and the suffix '0.4' for the remote station 12.4.

As in the case of the system 10, the system 10.1 is operative to provide a first comparison signal fBM at the output of the IF demodulator 32.3, and a second comparison signal fBR at the output of the IF demodulator 32.4.

The reference oscillators 44.3, 44.4 have substantially the same frequency. It is now necessary for the two frequencies to be precisely the same, although the oscillators should have a sufficiently high short term stability so that the frequency difference between them, if any, does not vary significantly in the time interval between successive measuring operations. There is therefore no need to establish a frequency and/or phase lock loop between the oscillators. This avoids the introduction of transmission noise into the reference oscillators.

Each of the microprocessors 42.3 and 42.4 has an onboard clock counter 43.3 and 43.4 respectively which is clocked by the output of the respective reference oscillator 44.3, 44.4. The clock counters may also be provided separate from the microprocessors.

If desired, a synchronization code can be generated from time to time by the microprocessor 42.3. This is transmitted to the remote station 12.4 and received in the same manner as that in which the command signals referred to earlier with reference to FIG. 1 are transmitted and received. The synchronisation code is used to synchronise the programmes of the microprocessors 42.3 and 42.4.

At the master station 12.3, the first comparison signal is fed to the first squaring amplifier 36.3, which provides a first zero-crossing signal. The first zero-crossing signal is fed to the microprocessor 42.3.

The clock counter 43.3 is enabled at a zero-crossing of a first reference signal which is derived from the output of the reference oscillator 44.3 and which is suitably close to the comparison frequency. The clock counter 43.3 is disabled again at the next zero-crossing of the respective comparison signal as obtained from the squaring amplifier 36.3 and the count read by the microprocessor. The above procedure is repeated for a predetermind number of cycles of the reference signal, there being an interval of at least one cycle between successive readings. The counts are accumulated in an accumulator to provide a first secondary measurement representing the average phase difference between the first reference signal and the first comparison signal. Suitable provision is made in the programming of the microprocessor 42.3 to check the counts and, if necessary, make the necessary correction to avoid ambiguity problems that could arise as a result of noise in the comparison signal, thereby to ensure that a valid average of a number of cycles is obtained.

In the same manner a digital value is accumulated in the clock counter 43.4 at the remote station, thus providing a second secondary measurement representing the average phase difference between a second reference signal and the second comparison signal. The second reference signal is obtained from the output of the reference oscillator 44.4 and is also suitably close to the comparison frequency.

The second secondary measurement is relayed in coded form to the master station 12.2 by making use of the subcarrier generator 28.4 and the subcarrier modulator 30.4. This is preferably done at a time when the carrier is not used to propagate one of the auxiliary pattern signals. At the master station 12.3 the relayed second secondary measurement is recovered by making use of the IF demodulator 32.3 and the subcarrier demodulator 34.3. From the subcarrier demodular 34.3 the relayed second secondary measurement is fed as data input to the microprocessor 42.3, where it is processed further, together with the first secondary measurement.

It will be seen that the results of the phase measuring steps are converted to digital form at the earliest opportunity. Digital data does not deteriorate in being stored or transmitted in the way that the second comparison signal in the system of FIG. 1 deteriorates in being relayed to the master station 12.1.

The effect of a frequency difference (or phase slip) between the reference oscillators 44.3 and 44.4 will now be dealt with.

Let the frequency of the reference oscillator 44.3 be $F_{refM}$, that of the reference oscillator 44.4 be $F_{refR}$, and that of the comparison frequency be $f_B$. At a given time t, the phases of the reference oscillators and the phases of the comparison signals will be:

|  | AT MASTER STATION | AT REMOTE STATION |
|---|---|---|
| reference oscillators | $2\pi t F_{refM} + C_M$ | $2\pi t F_{refR} + C_R$ |

| -continued | |
|---|---|
| | AT MASTER STATION | AT REMOTE STATION |
| comparison signals | $2\pi tfB + CBM$ | $2\pi tfB + CBR$ |

Where CM, CR, CBM and CBR are the respective phase values at time t=0.

The phase difference at the master station therefore is:

$$2\pi tFrefM + CM - 2\pi tfB - CBM$$

and the phase difference at the remote station:

$$2\pi tFrefR + CR - 2\pi tfB - CBR$$

After relaying of the phase data obtained at the remote station to the master station, and comparison with the phase data obtained locally at the master station, the following primary phase measurement is obtained:

$$\alpha = (CBM - CBR) - 2\pi t(FrefM - FrefR) - (CM - CR)$$

The term $(CBM-CBR)$ represents the wanted phase information.

Two such phase measurements, one obtained at time t1 and at a reference pattern frequency fPr, and the other at time t2 and at a pattern frequency fP1, will provide:

$$\alpha Pr = (CBM - CBR)' - 2\pi t1(FrefM - FrefR) - (CM - CR);$$

and $$\alpha P1 = (CBM - CBR)'' - 2\pi t2(FrefM - FrefR) - (CM - CR).$$

Subtracting to obtain a derived measurement corresponding to a measuring frequency fM/b 1 provides:

$$\alpha M1 = (CBM - CBR)' - (CBM - CBR)'' - 2\pi(t1-t2)(FrefM - FrefR)$$

The term $(CBM-CBR)'-(CMB-CBR)''$ represents the desired phase information, whereas the remaining term on the right-hand side of the equation represents a deviation resulting from the frequency difference, if any, between the reference oscillators 44.3 and 44.4. The deviation can be reduced to negligible proportions by choice of sufficiently stable reference oscillators having frequencies FrefM and FrefR sufficiently close together; it can be eliminated by determining and applying a suitable correction factor; or it can be eliminated by carrying out straddle measurements.

For example, assume that the reference oscillators 44.3 and 44.4 are crystal controlled oscillators which can be adjusted so that the frequency difference between them is at most two parts per million. Also, assume that the time difference t2−t1 between the two measuring steps is 0.5 sec. In this event, the term $2\pi(t1-t2)(FrefM-FrefR)$ represents a phase deviation of one thousandth of a full phase rotation at a comparison frequency of 1 kHz. This deviation can be ignored as being insignificant. Alternatively, the rate at which the deviation changes with time can be determined by, for example, obtaining a primary measurement at the same pattern/auxiliary pattern frequency combination, at the beginning and again at the end of a full sequence of measuring steps. Dividing the difference between the two primary measurements thus obtained by the time span between them provides the rate at which the phase deviation changes with time. Once this rate is known, the derived measurements $\alpha M1$, $\alpha M2$, etc can be adjusted so as to compensate for the term $2\pi(t1-t2)(FrefM-FrefR)$.

What constitutes suitably close frequencies depends on how the effects of phase slips in the reference frequencies are catered for. It further depends on the way the measurements obtained since at very large slip rates ambiguous results may be obtained as a result of the modulo behaviour of the means used for obtaining the measurements.

Where straddle measurements are made, a further measuring step at the reference frequency is carried out, at time t3. The resulting primary measurement at time t3 will provide:

$$\alpha Pr' \times (CBM - CBR)''' - 2\pi t3(FrefM - FrefR) - (CM - CR)$$

The average primary measurement at the reference frequency is:

$$\frac{1}{2}\{(CBM - CBR)' + (CBM - CBR)'''\} - 2\pi\left(\frac{t1+t3}{2}\right)(FrefM - FrefR) - (CM - CR)$$

Subtracting to obtain a derived measurement at measuring frequency fM1 provides:

$$\alpha M1 =$$

$$\frac{1}{2}\{(CBM - CBR)' + (CBM - CBR)'''\} - (CBM - CBR)'' -$$

$$2\pi\left(\frac{t1+t3}{2} - t2\right)(FrefM - FrefR)$$

At equal time intervals, i.e. when t1−t2=t2−t3:

$$\frac{t1+t3}{2} - t2 = 0$$

Also, because the measuring steps at time t1 and t3 are carried out at the same pattern/auxiliary pattern frequency combination:

$$(CBM - CBR)' = (CBM - CBR)'''$$

Accordingly:

$$\alpha M1 = (CBM - CBR)' - (CBM - CBR)''$$

The term $2\pi(t1-t2)(FrefM-FrefR)$ has disappeared, leaving only the desired phase information.

It will be appreciated that the second secondary measurements obtained at the remote station need not be relayed to the master station at the end of each measuring step. The data can, if desired, be saved temporarily at the remote station and relayed to the master station at a convenient time. Futhermore, if desired, the volume of second secondary measurements may be reduced by partly processing them at the remote station before being relayed to the master station.

I claim:

1. A method of obtaining a primary measurement of the differences in the phase relationship between a pair of comparison signals at predetermined different times, the two comparison signals existing simultaneously and having the same comparison frequency, a first of the comparison signals being produced at a first station and a second of the comparison signals being produced at a second station spaced from the first station, which method comprises:

generating at the first station a first frequency-stable reference signal having a first reference frequency suitably close to the comparison frequency;

generating at the second station a second frequency-stable reference signal having a second reference frequency suitably close to the comparison frequency;

measuring at the first station the phase relationship between the first comparison signal and the first reference signal at each of said predetermined times to provide a first secondary measurement;

measuring at the second station the phase relationship between the second comparison signal and the second reference signal at each of said predetermined times to provide a second secondary measurement; and bringing together and suitably processing the first and second secondary measurements to extract therefrom said primary measurement.

2. A method according to claim 1, wherein the first and second comparison signals are produced by:

causing a pattern signal having an accurately known pattern frequency to be propagated electromagnetically from the first station to the second station;

causing an auxiliary pattern signal to be propagated electromagnetically from the second station to the first station;

mixing the pattern signal with the auxiliary pattern signal at the first station to produce said first comparison signal; and mixing the pattern signal with the auxiliary pattern signal at the second station to produce said second comparison signal, the comparison frequency being equal to the frequency difference between the pattern frequency and the auxiliary pattern frequency.

3. A method according to claim 2, wherein each of said pattern signals is derived from a first clock signal, wherein each corresponding auxiliary pattern frequency is derived from a second clock signal, wherein the first reference signal is derived from the first clock signal, and wherein the second reference signal is derived from the second clock signal.

4. A method according to claim 2, wherein:

a said measuring step at each respective station is carried out at each of times t1, t2, and tx respectively;

the measuring steps at times t1 and tx are each carried out on a respective comparison signal produced by pattern signals of the same pattern frequency and auxiliary pattern signals of the same auxiliary pattern frequency; and said processing includes, by means of a suitably programmed date processor;

computing a correction factor k in accordance with the following quotation:

$$k = \frac{a1 - b1 - ax + bx}{tx - t1}$$

where
a1 and b1 are the first and second secondary measurements respectively provided by the measuring steps at time t1; and ax and bx are the first and second secondary measurements respectively provided by the measuring steps at time tx; and computing said primary measurement in accordance with the following equation:

$$a = a1 - b1 - a2 + b2(t2 - t1)$$

where $\alpha$ is the primary measurement; and
a2 and b2 are the first and second secondary measurements respectively provided by the measuring steps at time t2.

5. A method according to claim 2, wherein:

a said measuring step is carried out at each of times t1, t2 and t3 respectively;

the measuring steps are carried out at equally spaced time intervals so that $t1 - t2 = t2 - t3$;

the measuring steps at times t1 and t3 respectively are carried out on respective comparison signals produced by pattern signals of the same pattern frequency and auxiliary pattern signals of the same auxiliary pattern frequency; and said processing includes computing said primary measurement in accordance with the following equation:

$$\alpha = \frac{a1 - b1 + a3 - b3}{2} - a2 = b2$$

where
$\alpha$ is the primary measurement;
a1 and b1 are the first and second secondary measurements respectively provided by the measuring steps at time t1;
a2 and b2 are the first and second secondary measurements respectively provided by the measuring steps at time t2; and
a3 and b3 are the first and second secondary measurements respectively provided by the measuring steps at time t3.

6. A method of continuous wave electromagnetic distance measurement in which each of a plurality of primary measurements are obtained in accordance with the method claimed in claim 2, and wherein the distance between the first and second stations is derived from the primary measurements.

7. A method of continuous wave electromagnetic distance measurement in which each of a plurality of primary measurements are obtained in accordance with the method claimed in claim 5, and wherein the distance between the first and second stations is derived from the primary measurements.

8. A method according to claim 1, wherein:

the phase relationship between the first comparison signal and the first reference signal at each of said predetermined times is measured as an average over several cycles of the first comparison signal; and the phase relationship between the second comparison signal and the second reference signal at each of said predetermined times is measured as an average over several cycles of the second comparison signal.

9. Apparatus for obtaining a primary measurement of the differences in the phase relationship between a pair of comparison signals at predetermined different times, the two comparison signals existing simultaneously and having the same comparison frequency, a first of the comparison signals being produced at a first station and a second of the comparison signals being produced at a second station spaced from the first station, which apparatus comprises:

- means at the first station for generating a first frequency-stable reference signal having a first reference frequency suitably close to the comparison frequency;
- means at the second station for generating a second frequency-stable reference signal having a second reference frequency suitably close to the comparison frequency;
- means at the first station for measuring the phase relationship between the first comparison signal and the first reference signal at each of said predetermined times to provide a first secondary measurement;
- means at the second station for measuring the phase relationship between the second comparison signal and the second reference signal at each of said predetermined times, thereby to obtain a second secondary measurement; and
- means for bringing together and suitably processing the first and second secondary measurements to extract therefrom said primary measurement.

10. Apparatus according to claim 9, which further comprises:

- means for transmitting a pattern signal having an accurately known pattern frequency from the first station to the second station;
- means for transmitting an auxiliary pattern signal from the second station to the first station;
- means for mixing the pattern signal with the auxiliary pattern signal at the first station to produce said first comparison signal; and
- means for mixing the pattern signal with the auxiliary pattern signal at the second station to produce said second comparison signal, the comparison frequency being equal to the frequency difference between the pattern frequency and the auxiliary pattern frequency.

* * * * *

UNITED STATES PATENT AND TRADEMARK OFFICE
CERTIFICATE OF CORRECTION

PATENT NO. : 4,577,150
DATED : MARCH 18, 1986
INVENTOR(S) : Jan SCHREUDER

It is certified that error appears in the above-identified patent and that said Letters Patent is hereby corrected as shown below:

ABSTRACT:
    line 6: "propogated" should read --propagated--

Figure 1:
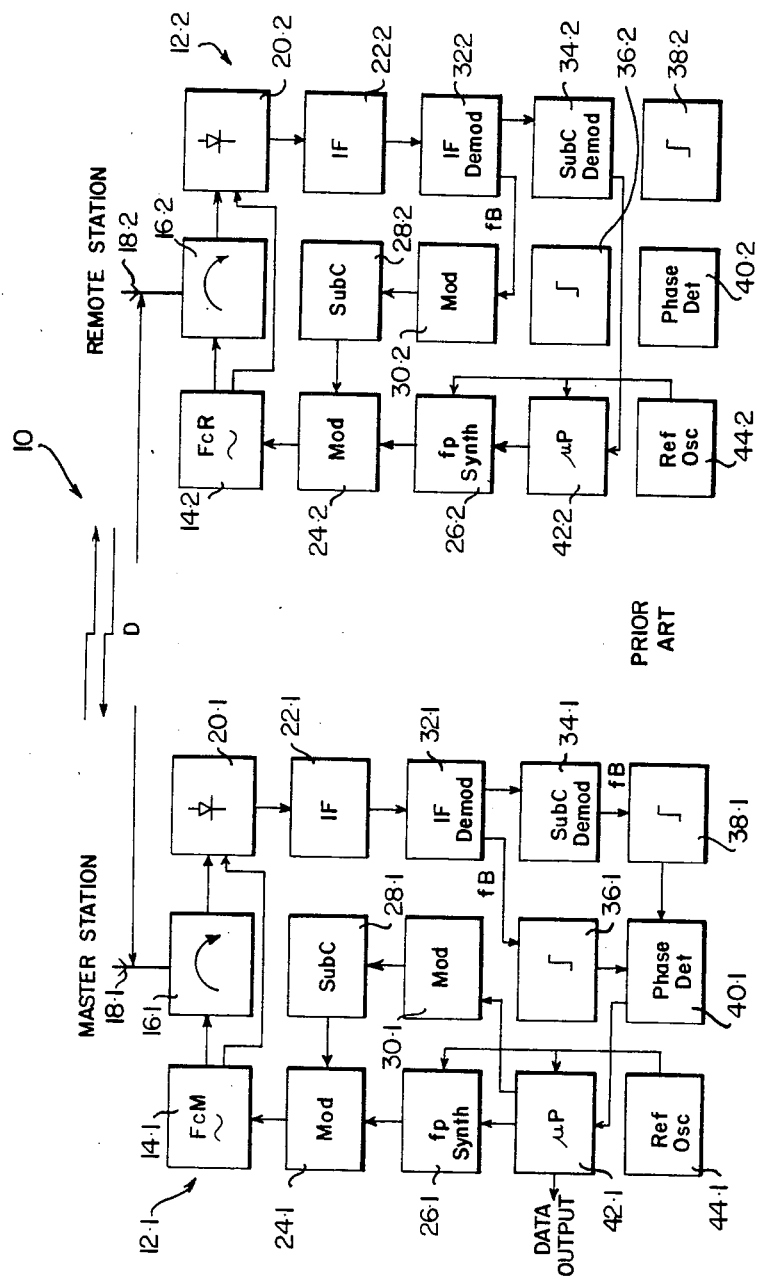
Figure 2:
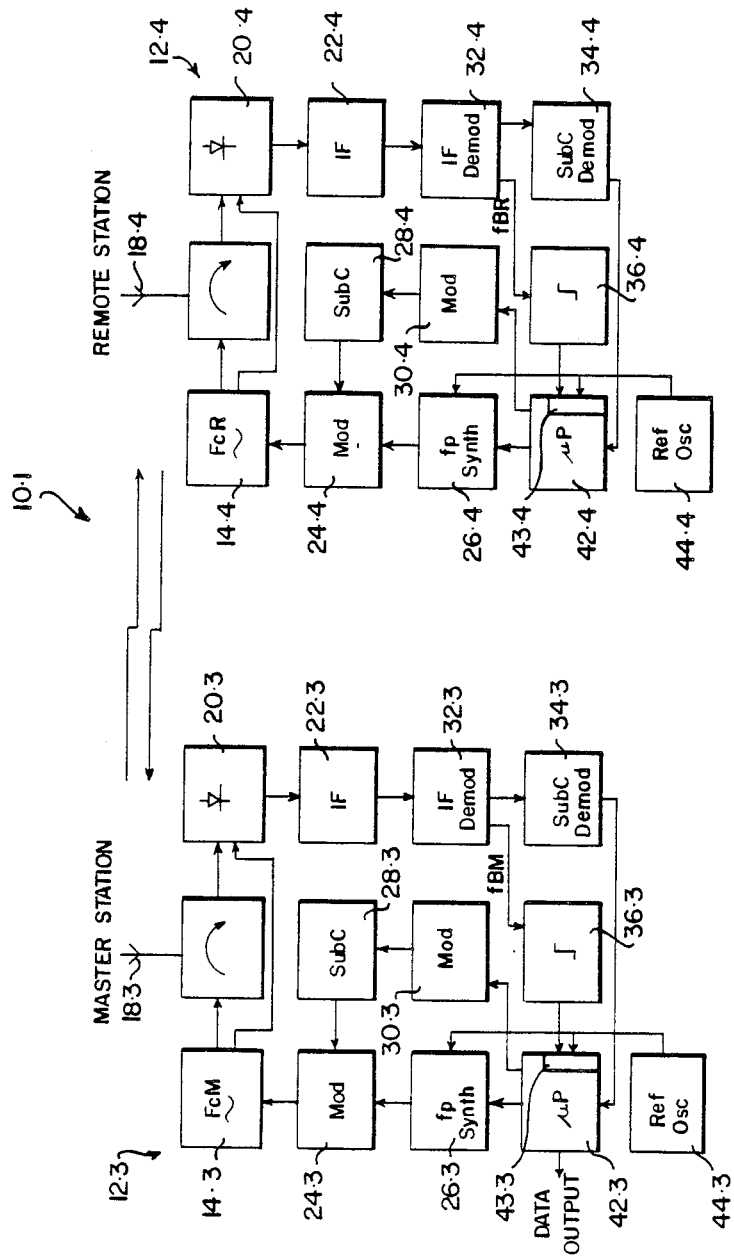

COLUMN 3:
    line 28: "quotation" should read --equation--
    line 32: the formula should read $$k = \frac{a1 - b1 - ax + bx}{tx - t1}$$

line 35: "abd" should read --and--
    line 38: "secondarys" should read --secondary--
    line 45: the formula should read $$\alpha = a1 - b1 - a2 + b2 - k(t2 - t1)$$

line 68: the formula should read $$\alpha = \frac{a1 - b1 + a3 - b3}{2} - a2 + b2$$

COLUMN 4:
    line 1 : "whereas" should read --where--
    line 59: "0.1" should read --.1--
    line 60: "0.2" should read --.2--

COLUMN 6:
    line 68: "techniques" should read --technique--

COLUMN 7:
    line 2 : the word "primary" should be deleted
    line 4 : the word --derived-- should be inserted before "measurements"
    line 41: "0.3" should read --.3--
    line 42: "0.4" should read --.4--

UNITED STATES PATENT AND TRADEMARK OFFICE
CERTIFICATE OF CORRECTION

PATENT NO. : 4,577,150  Page 2 of 3

DATED : MARCH 18, 1986

INVENTOR(S) : Jan SCHREUDER

It is certified that error appears in the above-identified patent and that said Letters Patent is hereby corrected as shown below:

line 50: "now" should read --not--

COLUMN 8:

line 50: the word "phase" should be deleted

COLUMN 9:

line 18: "phase data" should read --secondary measurement--
      line 20: "phase data" should read --secondary measurement--
      line 21: the word "phase" should be deleted
      line 27: "phase" should read --primary--

COLUMN 10:

line 13: the word --are-- should be inserted before "obtained"

COLUMN 11:

line 66: "date" should read --data--
      line 68: "quotation" should read --equation--

UNITED STATES PATENT AND TRADEMARK OFFICE
CERTIFICATE OF CORRECTION

PATENT NO. : 4,577,150
DATED : MARCH 18, 1986
INVENTOR(S) : Jan SCHREUDER

It is certified that error appears in the above-identified patent and that said Letters Patent is hereby corrected as shown below:

COLUMN 12:

line 15: the formula should read $$\alpha = a1 - b1 - a2 + b2 - k(t2 - t1)$$

line 35: the formula should read $$\alpha = \frac{a1 - b1 + a3 - b3}{2} - a2 + b2$$

Signed and Sealed this

Thirtieth Day of December, 1986

Attest:

DONALD J. QUIGG

Attesting Officer

Commissioner of Patents and Trademarks